US 8,503,041 B2

(12) United States Patent
Kim

(10) Patent No.: US 8,503,041 B2
(45) Date of Patent: Aug. 6, 2013

(54) SCANNER CAPABLE OF DETECTING THE ORIENTATION OF ARRANGED DOCUMENT AND IMAGE READING APPARATUS INCLUDING THE SAME

(75) Inventor: Won-Taek Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 493 days.

(21) Appl. No.: 12/606,472

(22) Filed: Oct. 27, 2009

(65) Prior Publication Data

US 2010/0103480 A1  Apr. 29, 2010

(30) Foreign Application Priority Data

Oct. 28, 2008 (KR) .................. 10-2008-0106164

(51) Int. Cl.
*H04N 1/04* (2006.01)
*H04N 1/40* (2006.01)
*H04N 1/46* (2006.01)
*G06K 15/00* (2006.01)
*G06F 3/12* (2006.01)
*G09G 5/00* (2006.01)
*G03G 21/00* (2006.01)
*G03G 15/00* (2006.01)
*B65H 7/02* (2006.01)
*B42C 13/00* (2006.01)
*B42C 9/00* (2006.01)

(52) U.S. Cl.
USPC .......... 358/474; 358/444; 358/505; 358/1.14; 358/1.15; 358/498; 358/488; 345/156; 399/389; 399/82; 399/75; 271/227; 412/37; 412/12

(58) Field of Classification Search
USPC ........ 358/474, 505, 1.14, 1.15, 488; 399/389
See application file for complete search history.

(56) References Cited

U.S. PATENT DOCUMENTS 5,519,483 A * 5/1996 Kawanishi et al. ............. 399/45
5,815,786 A   9/1998 Isemura
6,268,937 B1 * 7/2001 Kim .............................. 358/488

FOREIGN PATENT DOCUMENTS

JP  9-114330   5/1997
KR  0161248    8/1998

OTHER PUBLICATIONS

Korean Office Action mailed Feb. 12, 2013 for corresponding Korean Application No. 10-2008-0106164.

* cited by examiner

*Primary Examiner* — Charlotte M Baker
*Assistant Examiner* — Rury Grisham
(74) *Attorney, Agent, or Firm* — Staas & Halsey LLP

(57) ABSTRACT

Disclosed are a scanner and an image reading apparatus including the same. The scanner can include a transparent plate, a scanning unit configured to scan a document on the transparent plate, a first sensor and a second sensor. The first sensor is positioned in a first document zone that is associated with an area in which a first document type is to be positioned based on a first alignment reference point provided on the transparent plate. The second sensor is positioned in a second document zone that is associated with an area in which a second document type of a different size is positioned based on a second alignment reference point provided on the transparent plate. The first document zone and the second document zone are non-overlapping zones. The document type and/or orientation can be determined based on the detection signals from the first and second sensors.

17 Claims, 4 Drawing Sheets

SCANNER CAPABLE OF DETECTING THE ORIENTATION OF ARRANGED DOCUMENT AND IMAGE READING APPARATUS INCLUDING THE SAME

CROSS-REFERENCE TO RELATED APPLICATIONS

This application claims priority from Korean Patent Application No. 10-2008-0106164, filed on Oct. 28, 2008 in the Korean Intellectual Property Office, the disclosure of which is incorporated herein by reference in its entirety.

TECHNICAL FIELD

Apparatuses and devices consistent with various aspects of the present disclosure relate generally to a scanner and an image reading apparatus including the same, and more particularly, to a scanner that is capable of detecting a direction of an arranged document, and an image reading apparatus including the same.

BACKGROUND OF RELATED ART

A scanner is a device for scanning or reading an image from a document, and for converting the scanned image into image data. A scanner can be used as a finished product by itself, or can also be equipped within an image reading apparatus, such as, for example, in a copier, a multifunction copier, or other like apparatus.

A scanner can include a document arrangement unit disposed typically in an upper portion of a scanner body on which a document can be arranged. The scanner can also include a scanning unit disposed below the document arrangement unit for scanning an image of the document. The scanning unit can detect the type of document (e.g., paper sizes A3, A4, B5, A5) arranged on the document arrangement unit, and can also detect the orientation (e.g., widthwise, lengthwise) of which the document, is arranged so as to, for example, determine the range of necessary movement of the scanning unit and/or to feed the proper print medium when the scanned image data is subsequently printed.

When a document is of a relatively small size, such as, for example, an A5 document (148×210 mm), a B5 document (182×257 mm), or other like document, because the document can be arranged either widthwise or lengthwise on the document arrangement unit, an undesired result possible during the printing or scanning operation when only the type of the document can be determined, but not the orientation. For example, when an A5 size document is arranged widthwise, it is possible for a lengthwise A5 size print medium to be fed for printing by an improper determination of the arrangement orientation of the A5 size document. When this occurs, a widthwise document image can be recorded lengthwise on a print medium, possibly resulting a printing of a partial image where a portion of the document image being cut away.

SUMMARY OF THE DISCLOSURE

According to some aspects of the present disclosure, an image reading apparatus may be provided to include a transparent plate, a scanning unit, a first sensor and a second sensor. The transparent plate may define a surface on which to place a document. The scanning unit may be configured to scan the document placed on the transparent plate. The first sensor may be disposed in a first document zone. The second sensor may be disposed in a second document zone. The first document zone may be associated with a portion of a first surface area of the transparent plate in which a first document type is to be positioned based on a first alignment reference point on the transparent plate. The second document zone may be associated with a portion of a second surface area of the transparent plate in which a second document type having a size different from that of the first document type is to be positioned based on a second alignment reference point on the transparent plate different from the first alignment reference point on the transparent plate. The first document zone and the second document zone not overlapping each other.

The second document type may have a widthwise direction and a lengthwise direction. The second document zone may be associated with one of the widthwise direction and the lengthwise direction of the second document type.

The first sensor may be configured to generate a signal that indicates when the document is placed on the first document zone. The second sensor may be configured to generate a signal that indicates when the document is placed on the second document zone. The controller may be configured to move the scanning unit to a position along a scanning direction based on the signals generated by the first and second sensors.

The transparent plate may be configured such that a third document type having a size larger than the size of the first document type may be placed in both the first document zone and the second document zone of the transparent plate concurrently.

The second document type may have a smaller size than the first document type.

According to another aspect, an image reading apparatus may be provided to include a scanning unit and a document arrangement unit. The document arrangement unit may include a transparent plate on which a document to be scanned by the scanning unit is to be placed and a support configured to support the transparent plate. Document arrangement information may be provided on a surface of the document arrangement unit so that a first document type is positioned on the transparent plate based on a first alignment reference point and a second document type having a different size than the first document type is positioned on the transparent plate based on a second alignment reference point different from the first alignment reference point.

The document scanner may further comprise a first sensor and a second sensor. The first sensor may be disposed in a first document zone. The second sensor may be disposed in a second document zone. The first document zone may be associated with a portion of a first surface area of the document arrangement unit in which a first document type is to be positioned based on a first alignment reference point on the document arrangement unit. The second document zone may be associated with a portion of a second surface area of the document arrangement unit in which a second document type having a size different from that of the first document type is to be positioned based on a second alignment reference point on the document arrangement unit different from the first alignment reference point on the transparent plate. The first document zone and the second document zone may be non-overlapping zones.

According to yet another aspect, an image reading apparatus may be provided to include a scanner configured to scan a document, a print unit, a feed unit and a controller. The print unit may be configured to print an image of the document scanned by the scanner on a print medium. The feed unit may be configured to feed the print medium to the print unit. The controller may be configured to control the feed unit. The scanner may comprise a transparent plate, a scanning unit, a first sensor and a second sensor. The transparent plate may define a surface on which to place the document. The scanning unit may be configured to scan the document placed on the transparent plate. The first sensor may be disposed in a first document zone. The second sensor may be disposed in a second document zone. The first document zone may be associated with a portion of a first surface area of the transparent plate in which a first document type is to be positioned based on a first alignment reference point on the transparent plate. The second document zone may be associated with a portion of a second surface area of the transparent plate in which a second document type having a size different from that of the first document type is to be positioned based on a second alignment reference point on the transparent plate different from the first alignment reference point on the transparent plate. The first document zone and the second document zone may be non-overlapping each other. The controller may be configured to receive detection signals generated by the first and second sensors, and to cause the feed unit to feed to the print unit select one of the first document type and the second document type based on the received detection signals.

The second document type may have a widthwise direction and a lengthwise direction. The second document zone may be associated with one of the widthwise direction and the lengthwise direction of the second document type.

The controller may be configured to control the feed unit to feed to the print unit a print medium of the second document type oriented in the lengthwise direction when the detection signal generated by the first sensor indicates that no document is placed in the first document zone of the transparent plate and the detection signal generated by the second sensor indicates that the document is placed in the second document zone of the transparent plate.

The controller may be configured to control the feed unit to feed to the print unit a print medium of the second document type oriented in the widthwise direction when the detection signals generated by the first and second sensors indicate that no document is placed in the first document zone and in the second document zone of the transparent plate.

The transparent plate may be configured such that a third document type having a larger size than the first document type is placed in the first document zone and in the second document zone of the transparent plate concurrently. The controller may be configured to control the feed unit to feed to the print unit a print medium of the third document type when the detection signals generated by the first and second sensors indicate that the document is place in both the first document zone and the second document zone of the transparent plate.

According to another aspect, an image reading apparatus may be provided to include a transparent plate, a scanning unit and two sensors. One of at least three document types of different sizes may be placed on the transparent plate. The scanning unit may be configured to scan a document placed on the transparent plate. The two sensors may be positioned spaced apart from each other such that detection signals generated by the two sensors in combination indicate a document type and an arrangement orientation of the document placed on the transparent plate.

The controller may control the feed unit to feed to the print unit a print medium of one of the three document types oriented in the lengthwise direction when the detection signal generated by one of the two sensors indicates that no document is placed in a first document zone of the transparent plate and the detection signal generated by the other of the two sensors indicates that the document is placed in a second document zone of the transparent plate.

The controller may control the feed unit to feed to the print unit a print medium of one of the three document types oriented in the widthwise direction when the detection signals generated by both of the two sensors second sensors indicate that no document is placed in the first document zone and in the second document zone of the transparent plate.

The controller may control the feed unit to feed to the print unit a print medium of another of the three document types when the detection signals generated by both of the two sensors indicate that the document is place in both the first document zone and the second document zone of the transparent plate.

The image reading apparatus may further comprise a print unit, a feed unit and a controller. The print unit may be configured to print an image corresponding to the document scanned by the scanning unit on a print medium. The feed unit may be configured to feed the print medium to the print unit. The controller may be configured to control the feed unit to feed to the print unit a print medium that corresponds to the document type and the arrangement orientation indicated by the detection signals generated by the two sensors.

According to even yet another aspect, an image reading apparatus may be provided to include a transparent plate, a first sensor, a second sensor and a controller. A document may be placed on the transparent plate. The first sensor may be disposed in a first document zone of the transparent plate. The first document zone may be associated with a first document type. The first sensor may be configured to generate an output indicating whether the document on the transparent plate covers the first document zone. The second sensor may be disposed in a second document zone of the transparent plate. The first document zone and the second document zone may not overlap each other. The second document zone may be associated with a second document type having a size different from the first document type. The second sensor may be configured to generate an output indicating whether the document on the transparent plate covers the second document zone. The second document type having a widthwise direction and a lengthwise direction. The controller may be configured to determine whether the document on the transparent plate is a first document type, a second document type oriented in a widthwise direction, or a second document type oriented in a lengthwise direction based on the outputs from the first and second sensors, and to move the scanning unit to a different starting position along a scanning direction based on whether the document on the transparent plate is a first document type, a second document type oriented in a widthwise direction, or a second document type oriented in a lengthwise direction.

BRIEF DESCRIPTION OF THE DRAWINGS

Various features and advantages of the present disclosure will become more apparent by the following detailed description of several embodiments thereof with reference to the attached drawings, of which.

DETAILED DESCRIPTION OF SEVERAL EMBODIMENTS

Figure 1:
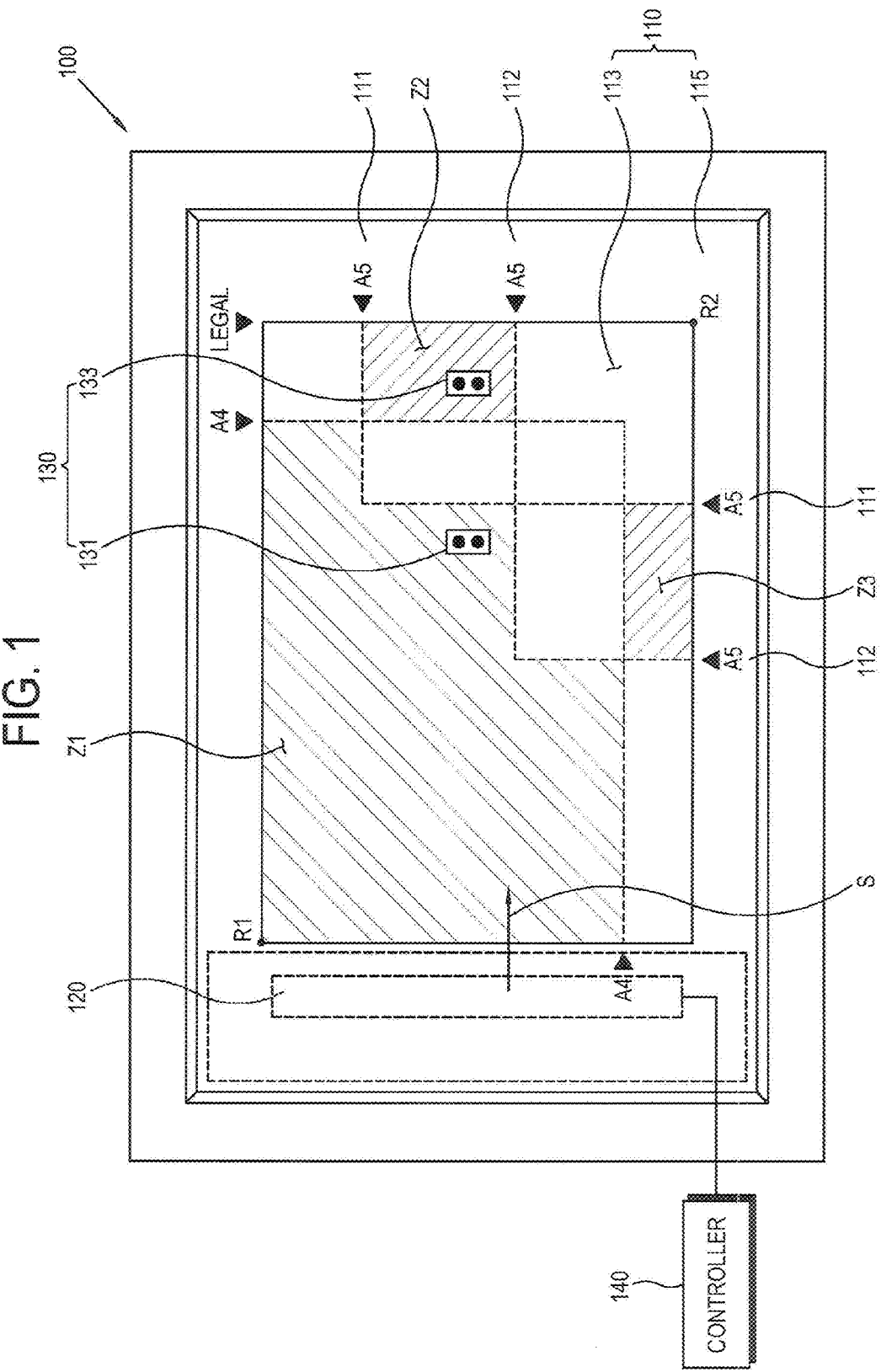
FIG. 1 is a schematic plan view of a scanner according to an embodiment of the present disclosure.

Reference will now be made in detail to several embodiment, examples of which are illustrated in the accompanying drawings, wherein like reference numerals refer to like elements throughout. While the embodiments are described with detailed construction and elements to assist in a comprehensive understanding of the various applications and advantages of the embodiments, it should be apparent however that the embodiments can be carried out without those specifically detailed particulars. Also, well-known functions or constructions will not be described in detail so as to avoid obscuring the description with unnecessary detail. It should also be noted that in the drawings, the dimensions of the features are not intended to be to true scale and may be exaggerated for the sake of allowing greater understanding. Repetitive description with respect to like elements of different embodiments may be omitted for the sake of brevity.

Referring to FIG. 1, a scanner 100 according to an embodiment of the present disclosure can include a scanning unit 120 configured to scan a document arranged on a transparent plate 113, and multiple sensors 130 configured to detect the document arranged on the transparent plate 113.

The scanning unit 120 can be disposed below the transparent plate 113. The scanning unit 120 can be configured to scan the document on the transparent plate 113 while moving along a sub scan direction S, for example.

The scanning unit 120 can include a light source (not shown) configured to emit light toward the document, an imaging lens (not shown) configured to form an image using the light reflected by the document, and an image sensor (not shown) configured to convert the image formed by the imaging lens (not shown) into an electrical signal. The image sensor (not shown) can include a charge coupled device (CCD) sensor, a complementary metal-oxide-semiconductor (CMOS) sensor, a contact image sensor (CIS), or a combination thereof, for example.

The multiple sensors 130 can include, by way of an example, a first sensor 131 and a second sensor 133 as shown in FIG. 1.

The first sensor 131 and the second sensor 133 can each include a light emitting portion (not shown) configured to emit light toward the transparent plate 113 and a light receiving portion (not shown) configured to receive light reflected by the document.

When the light receiving portion of any of the first sensor 131 and the second sensor 133 receives the light reflected by a document at the positions at which the first sensor 131 and the second sensor 133 are disposed, that is, when a received light signal generated by each of the first sensor 131 and the second sensor 133 is in the ON state, it can be determined that there is a document placed over the positions at which the sensors are disposed.

As illustrated in FIG. 1, the first sensor 131 and the second sensor 133 can be disposed in a non-overlapped zone Z1 (shown with double-dashed lines) and in one of non-overlapped zones Z2 and Z3 (both shown with dashed lines), respectively, of a first document zone on which a first document, an A4 size document, can be placed based on a first alignment reference point R1 on the transparent plate 113 and a second document zone on which a second document, an A5 size document that is smaller than the A4 size document, can be placed based on a second alignment reference point R2 different from the first alignment reference point R1.

It should be understood that A4 and A5 as the sizes of the first and second documents described above are only by way of example and that documents of other sizes can also be used.

The arrangement orientations of a document are herein referred to as a lengthwise orientation and a widthwise orientation. When the longitudinal direction, i.e., the longer side, of the document extends perpendicular to the sub scan direction S on the transparent plate 113, the arrangement orientation of that document herein is referred to as being in the lengthwise orientation. When the longitudinal direction of the document extends parallel to the sub scan direction S, on the other hand, the arrangement orientation of that document is herein referred to as being in the widthwise orientation.

In FIG. 1, the first alignment reference point R1 is a reference point to which any of an A4 size document, a LETTER size document, and a LEGAL size document can be aligned on the transparent plate 113. The second alignment reference point R2 is a reference point to which the A5 size document can be aligned on the transparent plate 113. The second alignment reference point R2 can be positioned diagonal to the first alignment reference point R1.

In this embodiment, the non-overlapped zones Z1, Z2 and Z3 shown in FIG. 1 can include three zones in total: an A4 zone Z1 that can be occupied by an A4 size document, an A5 lengthwise zone Z2 that can be occupied by an A5 size document arranged lengthwise and an A5 widthwise zone Z3 that can be occupied by an A5 size document arranged widthwise.

Each of the first sensor 131 and the second sensor 133 can be disposed in one of the non-overlapped zones Z1, Z2 and Z3. Although it is illustrated in FIG. 1 that the first sensor 131 is disposed in the A4 zone Z1 and the second sensor 133 is disposed in the A5 lengthwise zone Z2, this is only by way of example.

For example, in an alternative embodiment, the first sensor 131 and the second sensor 133 can be disposed in the A4 zone Z1 and the A5 widthwise zone Z3, respectively. When appropriate, the first sensor 131 and the second sensor 133 can be disposed in the A5 lengthwise Z2 and the A5 widthwise zone Z3, respectively. The total number of the possible configurations of the first sensor 131 and the second sensor 133 each being disposed in one of the three zones is six (6). The particular conditions for determining the type of document and the arrangement orientation of the document can vary based on the positions at which the first and second sensors 131 and 133 are disposed.

As shown in FIG. 1, the scanner 100 can further include a controller 140 configured to determine the type and the arrangement direction of a document based on detection signals generated by the first sensor 131 and the second sensor 133. As would be readily understood by those skilled in the art, the controller 140 may be, e.g., a microprocessor, a microcontroller or the like, that includes a CPU to execute one or more computer instructions to implement the various control operations herein described and/or control operations relating to one or more other components of the scanner 100 or the image reading apparatus 200 (shown in FIG. 4), and, to that end, may further include a memory device, e.g., a Random Access Memory (RAM), Read-Only-Memory (ROM), a flesh memory, or the like, for storing therein the one or more computer instructions.

As shown in FIG. 1, when the first sensor 131 and the second sensor 133 are disposed in the A4 zone Z1 and the A5 lengthwise zone Z2, respectively, the controller 140 can determine the type and the arrangement direction of a document according to a detection signal table such as, for example, Table 1 below.

TABLE 1

| Case | First sensor 131 | Second sensor 133 | Result of determination |
|------|------------------|-------------------|-------------------------|
| 1    | OFF              | OFF               | A5 (Widthwise)          |
| 2    | ON               | OFF               | A4 or LETTER            |

TABLE 1-continued

| Case | First sensor 131 | Second sensor 133 | Result of determination |
|------|------------------|-------------------|-------------------------|
| 3    | OFF              | ON                | A5 (Lengthwise)         |
| 4    | ON               | ON                | LEGAL                   |

In Table 1, "OFF" can refer to when the light receiving portions of the first sensor 131 and the second sensor 133 do not receive reflected light from a document, that is, that there is not a document covering the positions at which the first sensor 131 and the second sensor 133 are disposed. On the other hand, "ON" can refer to when the light receiving portions of the first sensor 131 and the second sensor 133 receive reflected light from a document, that is, that there is a document placed over the positions at which the first sensor 131 and the second sensor 133 are disposed.

Because "LEGAL" size documents are larger than A4 and A5 size documents, a "LEGAL" size document can be detected when the light receiving portions of the first sensor 131 and the second sensor 133 both detect the presence of the document. When signals from both the first sensor 131 and the second sensor 133 are "ON," it can be determined that a corresponding document is of the largest size, that is, it is a "LEGAL" size document.

Accordingly, it may not only be possible to detect the type of document on the transparent plate 113, that is, whether the document is A5, A4, LETTER, or LEGAL size document, for example, but it may also be possible to determine an arrangement orientation of the A5 size document (e.g., widthwise or lengthwise).

Moreover, it may be possible to detect the type of document from three different sizes (e.g., A5, A4, and LEGAL) and the arrangement orientations (e.g., widthwise, lengthwise) of the A5 size document by using only two sensors 131 and 133. As a result, it may be possible to reduce production costs by reducing the number of sensors that are needed to detect the type of document and the arrangement orientations.

The controller 140 can be configured to control the scanning unit 120 to move in response to the type and the arrangement orientation of the document detected by the multiple sensors 130.

For example, as a result of detection by the multiple sensors 130, when it is determined that a document placed on the transparent plate 113 is an A5 size document arranged in the widthwise orientation, the controller 140 can control the scanning unit 120 to move at a high speed through a section or portion in which it is expected that no document is placed and to move at a normal speed through a section in which it is expected that there is a document for scanning and in consideration of the desired resolution. That is, a moving speed of the scanning unit 120 in a particular section of the scanner 100 can be varied in accordance with whether a document is placed on that section or not.

In some embodiments, the controller 140 can be configured to control the scanning unit 120 to quickly move up to a section in which the document is placed.

In another embodiment, when the first sensor 131 is disposed in the A4 zone Z1 and the second sensor 133 is disposed in the A5 widthwise zone Z3, the controller 140 can determine the type and the arrangement orientation of a document based on the information associated with a detection signal, such as, for example, according to Table 2 below.

TABLE 2

| Case | First sensor 131 | Second sensor 133 | Result of determination |
|------|------------------|-------------------|-------------------------|
| 1    | OFF              | OFF               | A5 (Lengthwise)         |
| 2    | ON               | OFF               | A4 or LETTER            |
| 3    | OFF              | ON                | A5 (Widthwise)          |
| 4    | ON               | ON                | LEGAL                   |

When the first sensor 131 and the second sensor 133 are disposed in the A5 lengthwise zone Z2 and the A5 widthwise zone Z3, respectively, the controller 140 can determine the type and the arrangement direction of a document based on the information associated with a detection signal table such as, for example, according to Table 3 below.

TABLE 3

| Case | First sensor 131 | Second sensor 133 | Result of determination |
|------|------------------|-------------------|-------------------------|
| 1    | OFF              | OFF               | A4 or LETTER            |
| 2    | ON               | OFF               | A5 (Lengthwise)         |
| 3    | OFF              | ON                | A5 (Widthwise)          |
| 4    | ON               | ON                | LEGAL                   |

While three of the six different configurations in which the first sensor 131 and the second sensor 133 can be disposed have been illustrated in the tables described above, the remaining configurations can be sufficiently derived from the configurations described above, and thus a detailed explanation of the remaining configurations is omitted for brevity.

The scanner 100 can include a document arrangement unit 110 as shown in FIG. 1.

The document arrangement unit 110 can include the transparent plate 113 and a support 115 configured to support the transparent plate 113.

The transparent plate 113 can be made of transparent glass. The support 115 can be configured to extend in the scanner 100 beyond an outer perimeter of the transparent plate 113.

According to an embodiment, on the surface of the document arrangement unit 110 can be displayed document arrangement orientation information so that a first document can be positioned on the transparent plate 113 based on s first alignment reference point and a second document, which has a size different from the size of the first document, can be positioned on the transparent plate 113 based on the second alignment reference point different from the first alignment reference point.

As shown in FIG. 1, the document arrangement orientation information can include information relating to the alignment position of A4 and LEGAL size documents (e.g., "A4", "LEGAL") for the first alignment reference point R1 and information related to the alignment position of A5 size widthwise and lengthwise documents (e.g., "A5") for the second alignment reference point R2.

Figure 2:
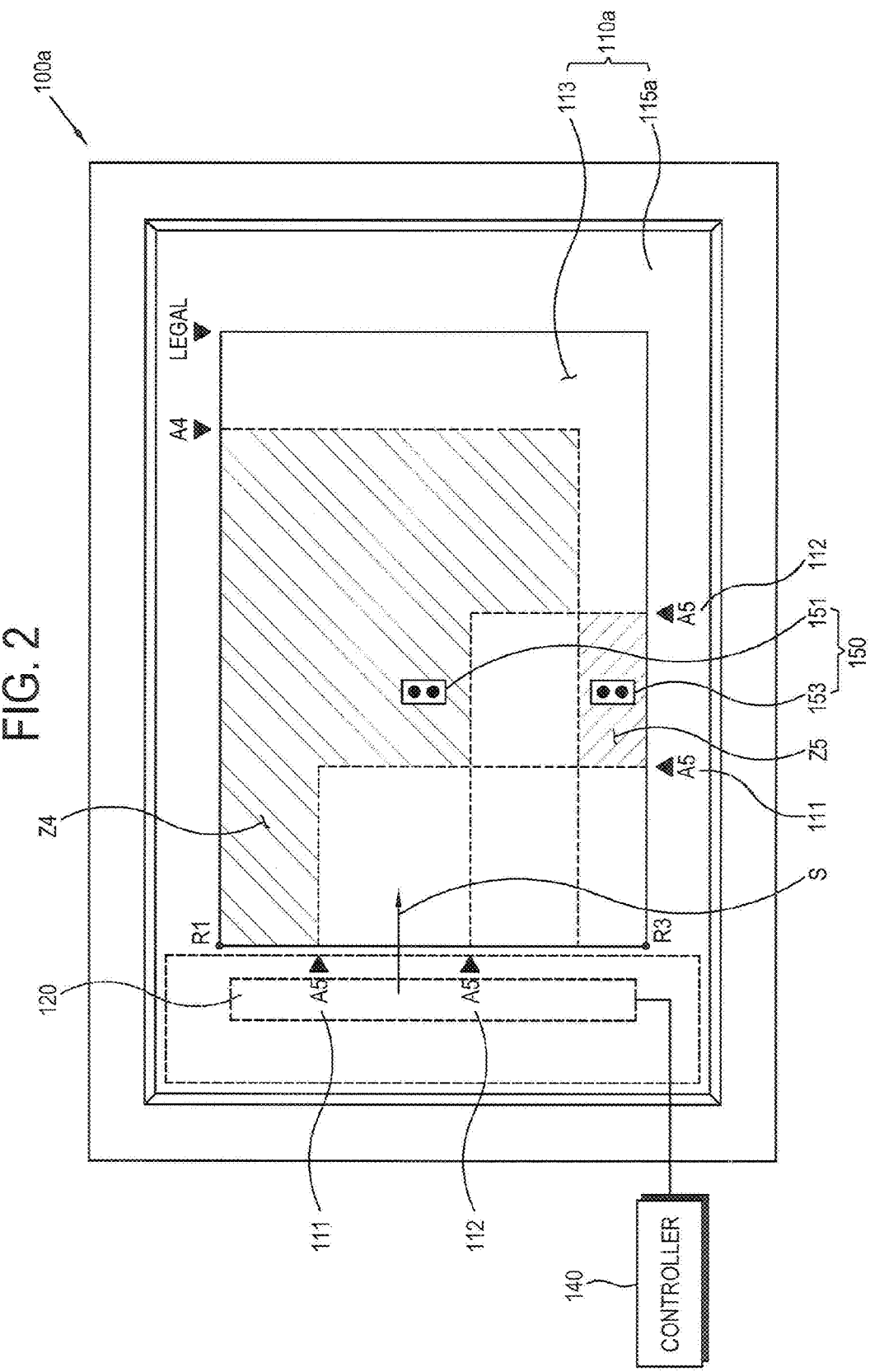
FIG. 2 is a schematic plan view of a scanner according to another embodiment of the present disclosure.
Figure 3:
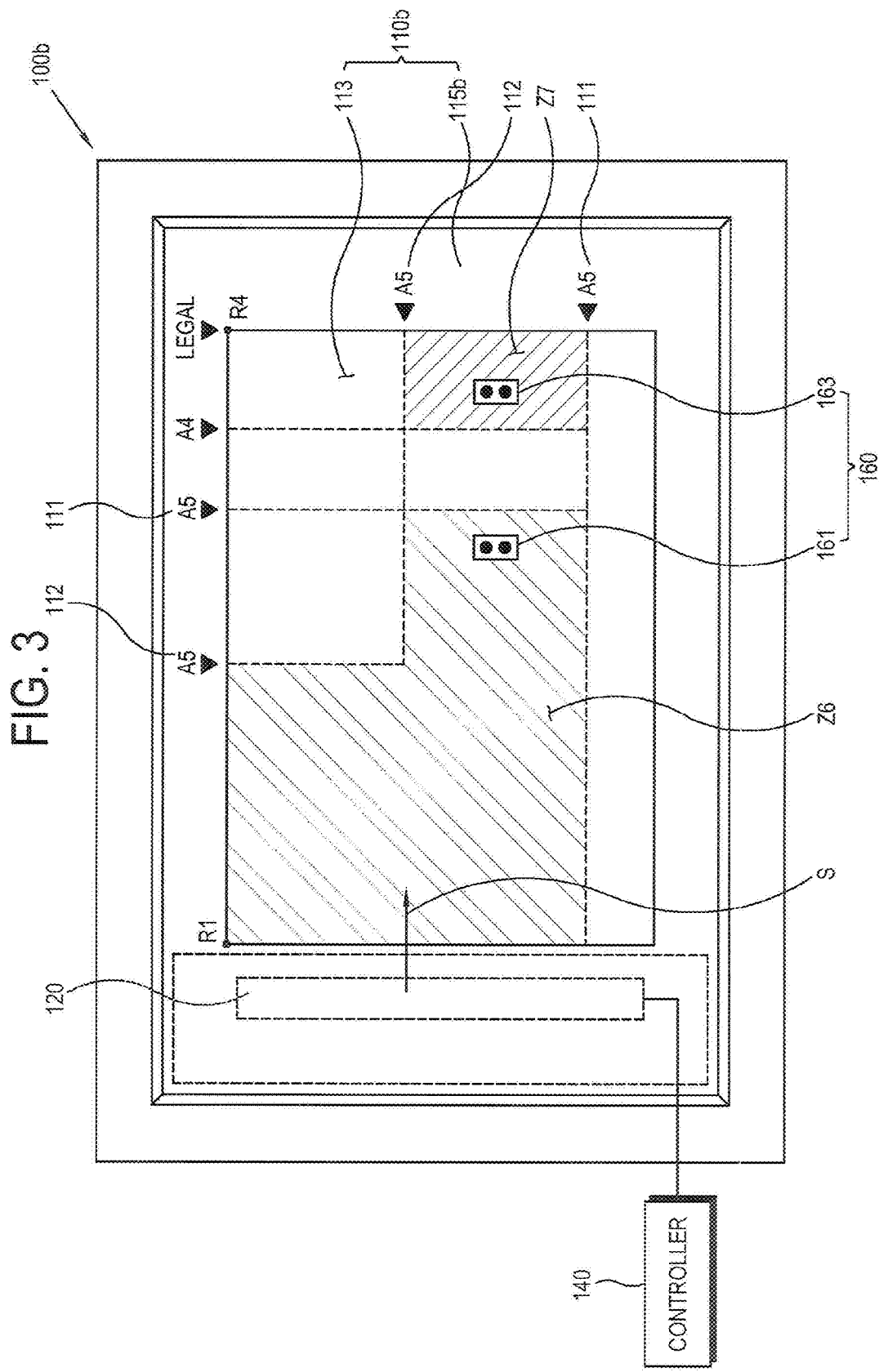
FIG. 3 is a schematic plan view of a scanner according to yet another embodiment of the present disclosure.

In FIGS. 1-3, the reference numeral "111" refers to the document arrangement orientation information associated with a lengthwise A5 size document while the reference numeral "112" refers to the document arrangement orientation information associated with a widthwise A5 size document.

Although the embodiment in FIG. 1 shows the document alignment direction information displayed on the support 115, in other embodiments, such information can be displayed on the transparent plate 113.

Moreover, the document alignment direction information can alternatively or additionally be an audible output that a user can receive instead of a visual output displayed on the document arrangement unit 110. Thus, the user can hear the document arrangement direction information and place the document accordingly on a determined position on the transparent plate 113.

FIG. 2 shows a scanner 100a according to another embodiment of the present disclosure, in which a third alignment reference point R3 and the first alignment reference point R1 are separated or offset from each other along a direction perpendicular to the sub scan direction S. In the embodiment shown in FIG. 2, two reference points R1 and R3 can be used to align documents on the transparent plate 113.

The scanner 100a can be different from the scanner 100 described above in that the location of the multiple sensors 150 is different from that of the sensors 130 of the scanner 100. This is because the third alignment reference point R3 is disposed at a position different from the position of the second alignment reference point R2.

In this embodiment, the document arrangement direction information (e.g., "A4", "A5", "LEGAL") can be displayed on a support 115a of a document arrangement unit 110a based on the third alignment reference point R3.

The multiple sensors 150 can include a first sensor 151 and a second sensor 153.

The first sensor 151 and the second sensor 153 can be disposed in non-overlapped zones Z4 (shown with double-dashed lines) and Z5 (shown with dashed lines), respectively, of a first document zone on which a first A4 size document can be positioned based on the first alignment reference point R1 on the transparent plate 113 and a second document zone on which a second A5 size document, which is smaller than the A4 size document, can be positioned based on the third alignment reference point R3.

It should be understood that using A4 and A5 size documents as the size of the first and second documents are only by way of example and that other size documents can also be used.

As shown in FIG. 2, the non-overlapped zones Z4 and Z5 can include two zones in total, i.e., an A4 zone Z4 that can be occupied by an A4 size document and an A5 widthwise zone Z5 that can be occupied by a widthwise A5 size document.

As shown in FIG. 2, because a zone on the transparent plate 113 in which a lengthwise A5 size document is arranged can overlap with a zone on the transparent plate 113 in which an A4 size document is arranged and with a zone on the transparent plate 113 in which a widthwise A5 size document is arranged, there can be no zone that is only occupied by the lengthwise A5 size document.

In this embodiment, each of the first sensor 151 and the second sensor 153 can be disposed in one of the A4 zone Z4 and the A5 widthwise zone Z5.

As shown in FIG. 2, when the first sensor 151 and the second sensor 153 are disposed in the A4 zone Z4 and the A5 widthwise zone Z5, respectively, the controller 140 can determine the type and the arrangement orientation of a document based on the information associated with a detection signal table, such as, for example, Table 4 below.

TABLE 4

| Case | First sensor 151 | Second sensor 153 | Result of determination |
|---|---|---|---|
| 1 | OFF | OFF | A5 (Lengthwise) |
| 2 | ON | OFF | A4 or LETTER |
| 3 | OFF | ON | A5 (Widthwise) |
| 4 | ON | ON | LEGAL |

FIG. 3 shows a scanner 100b according to yet another embodiment of the present disclosure, a fourth alignment reference point R4 and the first alignment reference point R1 can be separated or offset from each other along a direction parallel to the sub scan direction S, as shown in FIG. 3. The embodiment shown in FIG. 3 uses two alignment points, the first alignment reference point R1 and the fourth alignment reference point R4.

The scanner 100b in this embodiment can different from the scanner 100 described above in that the location of the multiple sensors 160 can be different from the location of the multiple sensors 130. This is because the fourth alignment reference point R4 is disposed at a position different from the position of the second alignment reference point R2.

In this embodiment, the document arrangement orientation information (e.g., "A4", "A5", "LEGAL") can be displayed on a support 115b of a document arrangement unit 110b based on the fourth alignment reference point R4.

The multiple sensors 160 can include a first sensor 161 and a second sensor 163.

The first sensor 161 and the second sensor 163 can be disposed in non-overlapped zones Z6 (shown with double-dashed lines) and Z7 (shown with dashed lines), respectively, of a first document zone on which a first A4 size document can be positioned based on the first alignment reference point R1 on the transparent plate 113 and a second document zone on which a second A5 size document, smaller than the A4 size document, can be positioned based on the fourth alignment reference point R4.

It should be understood that using A4 and A5 size documents as the size of the first and second documents are only by way of example and that other size documents can also be used.

As shown in FIG. 3, the non-overlapped zones Z6 and Z7 can include two zones in total, i.e., an A4 zone Z6 that can be occupied by only an A4 size document and an A5 lengthwise zone Z7 that can be occupied by a lengthwise A5 size document.

As shown in FIG. 3, because a zone on the transparent plate 113 in which a widthwise A5 size document is arranged can overlap with a zone on the transparent plate 113 in which an A4 size document is arranged and with a zone on the transparent plate 113 in which a lengthwise A5 size document is arranged, there can be no zone that is only occupied by the widthwise A5 size document.

In this embodiment, each of the first sensor 161 and the second sensor 163 can be disposed in one of the A4 zone Z6 and the A5 lengthwise zone Z7.

As shown in FIG. 3, when the first sensor 161 and the second sensor 163 are disposed in the A4 zone Z6 and the A5 lengthwise zone Z7, respectively, the controller 140 can determine the type and the arrangement direction of a document based on the information associated with a detection signal table, such as, for example, Table 5 below.

TABLE 5

| Case | First sensor 161 | Second sensor 163 | Result of determination |
|---|---|---|---|
| 1 | OFF | OFF | A5 (Widthwise) |
| 2 | ON | OFF | A4 or LETTER |
| 3 | OFF | ON | A5 (Lengthwise) |
| 4 | ON | ON | LEGAL |

Figure 4:
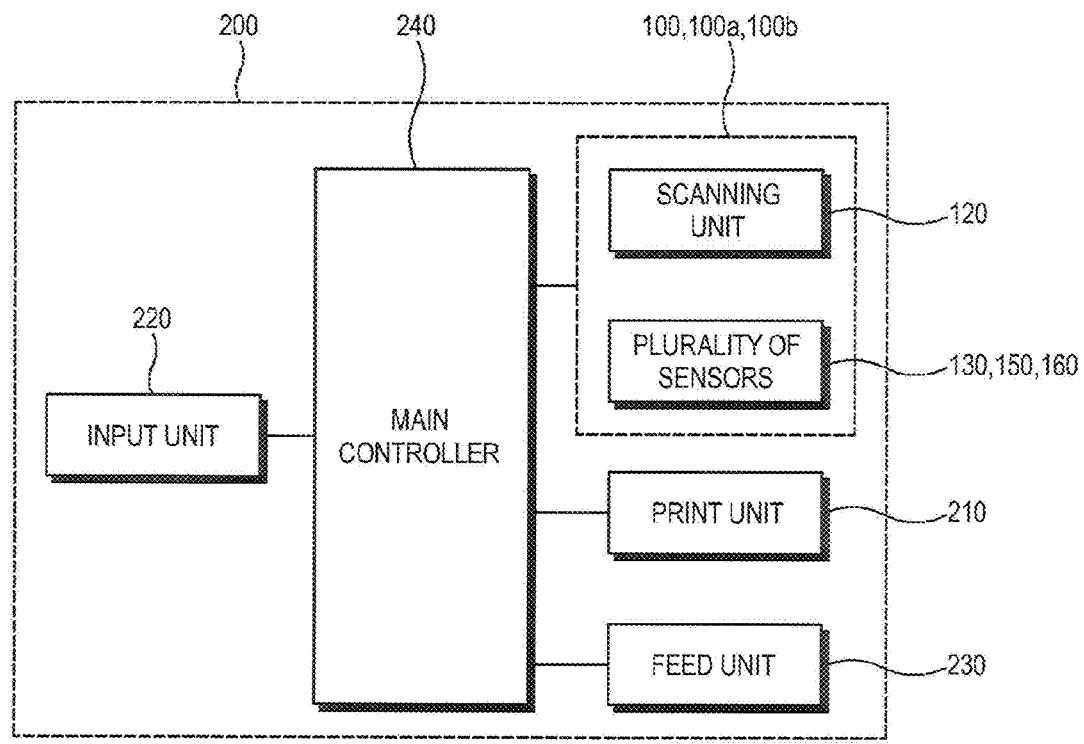
FIG. 4 is a block diagram of an image reading apparatus according to an embodiment of the present disclosure.

FIG. 4 shows an image reading apparatus 200 that can include one of the above-described scanners 100, 100a, and 100b, a print unit 210 configured to print an image corresponding to the image of the scanned document on a print medium, an input unit 220 configured to receive a print instruction from a user, a feed unit 230 configured to feed the print medium to the print unit 210, and a main controller 240 configured to control the above components. In some embodiments, the function of the controller 140 described above with respect to the scanners 100, 100a, and 100b can be performed by the main controller 240 of the image reading apparatus. In such embodiments, a separate controller 140 can be omitted. It should be understood that the main controller 240 may have substantially the same configuration and structure as previously described for the controller 140.

The print unit 210 can be configured to form an image based on an inkjet method of forming an image on a print medium by ink, an electro-photography method of forming an image on a print medium by toner, and/or a thermal transfer printing method of forming an image on a thermal-sensitive print medium using a thermal printing head (TPH).

For the inkjet method, the print unit 210 can include a printing head having multiple nozzles. For the electro-photography method, the print unit 210 can include an image carrier (not shown) having an organic photosensitive layer formed on its outer surface, an exposure unit (not shown) configured to form an electrostatic latent image on the image carrier (not shown), a developing cartridge (not shown) configured to develop the electrostatic latent image with toner, a transfer unit (not shown) configured to transfer the toner into a print medium and a fixing unit (not shown) configured to fix the transferred toner with heat and pressure.

The feed unit 230 can include multiple feed cassettes configured to load print media in correspondence with the type and the arrangement orientation of the document that may be placed on the transparent plate 113.

For example, the feed unit 230 can include four feed cassettes configured to load four types of print media corresponding to the above-mentioned A4 LEGAL, A5 (widthwise) and A5 (lengthwise) documents, respectively. In particular, the A5 size print medium can be provided such that it is fed to the print unit 210 in both the widthwise and the lengthwise orientations.

The main controller 240 can be configured to determine the type and the arrangement orientation of a document on the transparent plate 113 of the scanners 100, 100a, or 100b based on detection signals generated by the multiple sensors 130, 150, or 160, respectively.

The main controller 240 can be configured to cause the feed unit 230 to feed a corresponding print medium to the print unit 210 based on the type and the arrangement orientation of the document as determined.

For example, when the scanner has the multiple sensors 130 disposed as shown in FIG. 1, the main controller 240 can control the feed unit 230 to feed the print medium to the print unit 210 according to Table 1, for example.

For example, when the detection signals generated by the first sensor 131 and the second sensor 133 are "OFF" and "ON", respectively, as shown in Table 1, the main controller 240 can determine that a lengthwise A5 size document is placed on the transparent plate 113, and can control the feed unit 230 to feed a lengthwise A5 size print medium to the print unit 210.

Thus, it is possible to obtain a desired print result by supplying the appropriate print medium taking into consideration the arrangement orientation of the A5 size document.

When both of the detection signals generated by the first sensor 131 and the second sensor 133 are "OFF" as shown in Table 1, the main controller 240 can determine that a widthwise A5 size document is placed on the transparent plate 113, and can control the feed unit 230 to feed a widthwise A5 size print medium to the print unit 210.

For a LEGAL size document, which, according to an embodiment, may be the largest size that may be placed on the transparent plate 113, because such a document is detected by both the first sensor 131 and the second sensor 133, when both of the detection signals generated by the first sensor 131 and the second sensor 133 are "ON," the main controller 240 can control the feed unit 230 to feed a LEGAL size print medium to the print unit 210.

While the disclosure has been particularly shown and described with reference to several embodiments thereof with particular details, it will be apparent to one of ordinary skill in the art that various changes may be made to these embodiments without departing from the principles and spirit of the invention, the scope of which is defined in the following claims and their equivalents.

What is claimed is:

1. An image reading apparatus, comprising:
   a transparent plate defining a surface on which to place a document;
   a scanning unit configured to scan the document placed on the transparent plate;
   a first sensor disposed in a first document zone;
   a second sensor disposed in a second document zone; and
   a controller is configured to receive detection signals generated by the first and/or, second sensors and outputting a print medium corresponding to the detected signal,
   wherein the first document zone is associated with a portion of a first surface area of the transparent plate in which a first document type is to be positioned based on a first alignment reference point on the transparent plate, the second document zone being associated with a portion of a second surface area of the transparent plate in which a second document type having a size different from that of the first document type is to be positioned based on a second alignment reference point on the transparent plate different from the first alignment reference point on the transparent plate, the first document zone and the second document zone not overlapping each other.

2. The image reading apparatus according to claim 1, wherein the second document type has a widthwise direction and a lengthwise direction, the second document zone being associated with one of the widthwise direction and the lengthwise direction of the second document type.

3. The image reading apparatus according to claim 1, wherein the first sensor is configured to generate a signal that indicates when the document is placed on the first document zone, the second sensor being configured to generate a signal that indicates when the document is placed on the second document zone, the scanner further comprising: a controller configured to move the scanning unit to a position along a scanning direction based on the signals generated by the first and second sensors.

4. The image reading apparatus according to claim 1, wherein the transparent plate is configured such that a third document type having a size larger than the size of the first document type is placed in both the first document zone and the second document zone of the transparent plate concurrently.

5. The image reading apparatus according to claim 1, wherein the second document type has a smaller size than the first document type.

6. An image reading apparatus, comprising:
a scanning unit;
a document arrangement unit including a transparent plate on which a document to be scanned by the scanning unit is to be placed and a support configured to support the transparent plate, and
wherein document arrangement information is provided on a surface of the document arrangement unit so that a first document type is positioned on the transparent plate based on a first alignment reference point and a second document type having a different size than the first document type is positioned on the transparent plate based on a second alignment reference point different from the first alignment reference point;
a controller is configured to receive the document arrangement information generated by the document arrangement unit and outputting a print medium corresponding to the document arrangement information.

7. The image reading apparatus according to claim 6, further comprising:
a first sensor disposed in a first document zone; and
a second sensor disposed in a second document zone,
wherein the first document zone is associated with a portion of a first surface area of the document arrangement unit in which a first document type is to be positioned based on a first alignment reference point on the document arrangement unit, the second document zone being associated with a portion of a second surface area of the document arrangement unit in which a second document type having a size different from that of the first document type is to be positioned based on a second alignment reference point on the document arrangement unit different from the first alignment reference point on the transparent plate, the first document zone and the second document zone being non-overlapping zones.

8. The image reading apparatus according to claim 2, further comprising:
a print unit configured to print an image of the document scanned by the scanner on a print medium;
a feed unit configured to feed the print medium to the print unit; and
the controller configured to control the feed unit,
wherein the controller is configured to receive detection signals generated by the first and second sensors, and to cause the feed unit to feed to the print unit select one of the first document type and the second document type based on the received detection signals.

9. The image reading apparatus according to claim 8, wherein the controller is configured to control the feed unit to feed to the print unit a print medium of the second document type oriented in the lengthwise direction when the detection signal generated by the first sensor indicates that no document is placed in the first document zone of the transparent plate and the detection signal generated by the second sensor indicates that the document is placed in the second document zone of the transparent plate.

10. The image reading apparatus according to claim 8, wherein the controller is configured to control the feed unit to feed to the print unit a print medium of the second document type oriented in the widthwise direction when the detection signals generated by the first and second sensors indicate that no document is placed in the first document zone and in the second document zone of the transparent plate.

11. The image reading apparatus according to claim 8, wherein the transparent plate is configured such that a third document type having a larger size than the first document type is placed in the first document zone and in the second document zone of the transparent plate concurrently, and
wherein the controller is configured to control the feed unit to feed to the print unit a print medium of the third document type when the detection signals generated by the first and second sensors indicate that the document is place in both the first document zone and the second document zone of the transparent plate.

12. An image reading apparatus, comprising:
a transparent plate on which one of at least three document types of different sizes is to be placed;
a scanning unit configured to scan a document placed on the transparent plate;
two sensors positioned spaced apart from each other such that detection signals generated by the two sensors in combination indicate a document type and an arrangement orientation of the document placed on the transparent plate; and
a controller is configured to receive detection signals generated by the two sensors and outputting a print medium corresponding to the detected signals.

13. The image reading apparatus according to claim 12, further comprising:
a print unit configured to print an image corresponding to the document scanned by the scanning unit on a print medium;
a feed unit configured to feed the print medium to the print unit; and
the controller configured to control the feed unit to feed to the print unit a print medium that corresponds to the document type and the arrangement orientation indicated by the detection signals generated by the two sensors.

14. The image reading apparatus according to claim 13, wherein the controller controls the feed unit to feed to the print unit a print medium of one of the three document types oriented in the lengthwise direction when the detection signal generated by one of the two sensors indicates that no document is placed in a first document zone of the transparent plate and the detection signal generated by the other of the two sensors indicates that the document is placed in a second document zone of the transparent plate.

15. The image reading apparatus according to claim 14, wherein the controller controls the feed unit to feed to the print unit a print medium of one of the three document types oriented in the widthwise direction when the detection signals generated by both of the two sensors second sensors indicate that no document is placed in the first document zone and in the second document zone of the transparent plate.

16. The image reading apparatus according to claim 15, wherein the controller controls the feed unit to feed to the print unit a print medium of another of the three document types when the detection signals generated by both of the two sensors indicate that the document is place in both the first document zone and the second document zone of the transparent plate.

17. An image reading apparatus, comprising:
a transparent plate on which a document is to be placed;
a first sensor disposed in a first document zone of the transparent plate, the first document zone being associated with a first document type, the first sensor being configured to generate an output indicating whether the document on the transparent plate covers the first document zone;
a second sensor disposed in a second document zone of the transparent plate, the first document zone and the second document zone not overlapping each other, the second document zone being associated with a second document type having a size different from the first document type, the second sensor being configured to generate an output indicating whether the document on the transparent plate covers the second document zone, the second document type having a widthwise direction and a lengthwise direction; and a controller configured to determine whether the document on the transparent plate is a first document type, a second document type oriented in a widthwise direction, or a second document type oriented in a lengthwise direction based on the outputs from the first and second sensors, the controller being configured to move the scanning unit to a different starting position along a scanning direction based on whether the document on the transparent plate is a first document type, a second document type oriented in a widthwise direction, or a second document type oriented in a lengthwise direction, wherein the controller is configured to receive detection signals generated by the first and/or second sensors and outputting a print medium corresponding to the detected signal.

* * * * *

UNITED STATES PATENT AND TRADEMARK OFFICE
CERTIFICATE OF CORRECTION

PATENT NO.           : 8,503,041 B2
APPLICATION NO.      : 12/606472
DATED                : August 6, 2013
INVENTOR(S)          : Won-Taek Kim It is certified that error appears in the above-identified patent and that said Letters Patent is hereby corrected as shown below:

In the Claims
In Column 12, Line 28, In Claim 1, delete "and/or," and insert -- and/or --, therefor.
In Column 12, Line 29, In Claim 1, delete "signal," and insert -- signal; --, therefor.
In Column 14, Line 7, In Claim 11, delete "place" and insert -- placed --, therefor.
In Column 14, Line 54, In Claim 16, delete "place" and insert -- placed --, therefor.

Signed and Sealed this
Eighteenth Day of February, 2014

Michelle K. Lee
*Deputy Director of the United States Patent and Trademark Office*